United States Patent [19]

Wason

[11] Patent Number: 4,458,339

[45] Date of Patent: Jul. 3, 1984

[54] SEISMIC PROSPECTING USING A CONTINUOUS SHOOTING AND CONTINUOUS RECORDING SYSTEM

[75] Inventor: Cameron B. Wason, Plano, Tex.

[73] Assignee: Texas Instruments Incorporated, Dallas, Tex.

[21] Appl. No.: 193,998

[22] Filed: Oct. 6, 1980

[51] Int. Cl.³ .......................... G01V 1/22; G01V 1/28
[52] U.S. Cl. ...................................... 367/14; 367/23; 367/49
[58] Field of Search ................ 367/23, 21, 44, 49, 367/39, 41, 77, 42, 74, 14; 343/17.2 PC

[56] References Cited

U.S. PATENT DOCUMENTS

| | | | |
|---|---|---|---|
| 3,676,841 | 7/1972 | Anstey | 367/21 X |
| 3,858,168 | 12/1974 | Barr, Jr. et al. | 367/49 X |
| 4,049,078 | 9/1977 | Paitson et al. | 367/23 |
| 4,188,610 | 2/1980 | Nelson | 367/42 X |
| 4,202,048 | 5/1980 | Edwards | 367/74 |
| 4,204,278 | 5/1980 | Nelson | 367/39 |
| 4,207,962 | 6/1980 | Bouyoucos | 367/41 X |
| 4,218,765 | 8/1980 | Kinkade | 367/49 |
| 4,295,213 | 10/1981 | Mifsud | 367/23 |
| 4,314,364 | 2/1982 | Bickel | 367/49 |

OTHER PUBLICATIONS

W. H. Hayt and J. E. Kemmerly, *Engineering Circuit Analysis*, McGraw-Hill 1978, pp. 613, 616.

*Primary Examiner*—Maynard R. Wilbur
*Assistant Examiner*—K. R. Kaiser
*Attorney, Agent, or Firm*—Thomas G. Devine; Leo N. Heiting; Melvin Sharp

[57] ABSTRACT

A method of seismic prospecting is disclosed in which the seismic source is excited in such a manner as to maximize the use of the energy generated by the seismic source. In certain cases it may be desirable to convert the received seismic signals to their frequency domain counterparts before performing subsequent processing. Such conversion may be performed using the discrete Fourier transform with the result that transformed values are obtained only at certain discrete frequencies. It may further be desirable that processing be performed only at subsets of the total set of discrete frequencies with the values at the remaining frequencies being discarded. In the practice of the present invention, source energy is generated only at those discrete frequencies at which subsequent processing is to be performed. As a result there is substantially no source energy in the transform values at the frequencies which are discarded.

6 Claims, 7 Drawing Figures

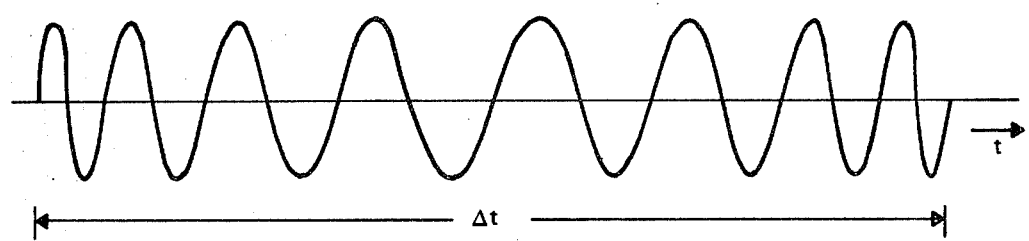
Fig. 4a
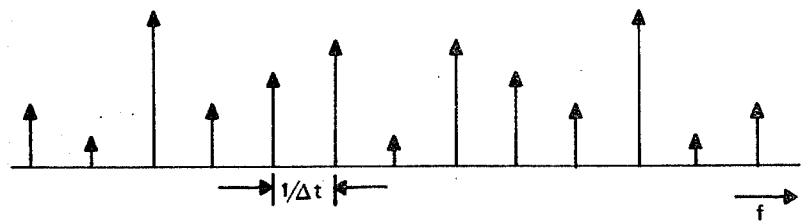
Fig. 4b
```
      1   2   3   4   5   6   7   8
  *   0   0   0   0   0   0   0   0
          2   3   4   5   6   7   8   1
  *       0   0   0   0   0   0   0   0
              3   4   5   6   7   8   1   2
  *           0   0   0   0   0   0   0   0
```
Fig. 5

SEISMIC PROSPECTING USING A CONTINUOUS SHOOTING AND CONTINUOUS RECORDING SYSTEM

BACKGROUND OF THE INVENTION

1. Field of the Invention

This invention relates generally to methods for seismic prospecting and more specifically to a method which optimizes the use of the energy available from a seismic source.

2. Description of the Prior Art

In the practice of seismic prospecting, acoustic energy is introduced into the earth at or near its surface by one of a variety of acoustic sources. Typical sources in a land prospecting environment include dynamite and vibrators. In marine prospecting it is customary to use air guns. In either case, an array of seismic receivers is arranged in the vicinity of the source. In the case of land prospecting this typically comprises a plurality of geophone groups arranged along a line extending from the source point, or in some cases in an areal distribution near the source point. In the case of marine prospecting, the seismic receivers typically comprise a plurality of hydrophones towed behind the boat in a seismic streamer.

When the source is fired, the energy propagates down through the material of the earth in the form of elastic waves. These waves are reflected by impedance discontinuities that occur at the boundary between layers of different subsurface materials. The reflected energy propagates back upward and is detected by the seismic receivers. Examination of the received signals by skilled analysts permits judgments to be made about the subsurface structure.

Typically, for each firing of the source, the data from the seismic receivers is recorded for a sufficient period of time $T_{max}$ to ensure that all reflections from the deepest reflector of interest are included in the record. Recording is then discontinued until the next source excitation is to occur. As a result there is no intermingling of reflections from two or more shots on any given record. Typically the sources are fired at intervals of ten seconds or more.

In most cases, processing and interpretation of the signals received by the receivers is performed in the time domain. It is also possible, however, to transform the signals and perform the processing in the frequency domain. Typically this would involve digitizing the received signals and transforming them by means of the discrete fourier transform (DFT). The output of the DFT is in the form of transformed values at each of a plurality of discrete frequencies. In this case, the frequency interval $\Delta f$ between the plurality of discrete frequencies at which independent data exists is determined by the recording time $T_{max}$. Specifically $$\Delta f = 1/T_{max}$$

SUMMARY OF THE INVENTION

For certain types of post-transformation processing it is not necessary or desirable to use the transformed values at all of the discrete frequencies. In some cases only ten percent of the available transformed values may be utilized. Thus there is a substantial reduction in the amount of data to be recorded and processed. If the data is collected using prior art methods, however, the discarding of a large percentage of the transformed values presents a problem.

Typical seismic sources such as those enumerated above introduce energy into the earth over a relatively broad band of frequencies. As a result, the received signals contain energy at the DFT frequencies which are discarded as well as at those frequencies that are retained for further processing. The energy at the discarded frequencies is effectively lost. Collection of the data in accordance with the principles of this invention effectively overcomes this problem. The data is collected in such a way as to ensure that substantially all of the energy introduced by the source occurs at those frequencies which are to be retained for further processing.

In the preferred embodiment of the invention, the frequencies at which transformed values are to be retained for further processing are evenly spaced over some range of frequencies. The source is then fired in such a way as to ensure that the power density spectrum of the energy introduced into the earth comprises a comb spectrum. Such a spectrum has substantial energy only at a plurality of evenly spaced discrete frequencies. This spectrum is chosen so that the discrete frequencies where substantial energy occurs correspond to the transformed frequencies which are to be retained for further processing.

In the case of an impulsive source, such as dynamite or an air gun, the comb power density spectrum is achieved by repeatedly firing the source at a constant repetition rate and continuously recording the data from the receivers. In this manner, the received signal at any point in time will include reflected energy from a plurality of the preceeding source firings. A typical interval between successive source firings is one second.

Vibrators typically generate continuous signals that are sinusoidal in form. The instantaneous frequency of the sine wave signals is controllable and is typically caused to vary through a linear sweep. In the practice of the present invention, however, the instantaneous vibrator frequency is frequency modulated by a second sine wave frequency. In this way, the vibrator can also be caused to impart energy to the earth having a comb spectrum.

It is therefore an object of the invention to provide a method of seismic prospecting wherein the signal imparted to the earth by a seismic source has substantial energy only at a plurality of discrete frequencies.

It is another object of the invention to control the source power density spectrum so that it comprises a comb spectrum.

It is a further object of the invention to provide a method of seismic prospecting wherein the signals generated by the seismic receivers include energy from two or more of a series of impulsive source firings.

It is yet another object of the invention to provide a method of seismic prospecting wherein an impulsive seismic source is fired at intervals substantially less than those that have been used previously.

It is also an object of the invention to provide a method of seismic prospecting wherein the source is fired continuously or periodically and the data from the seismic receivers is recorded continuously.

It is still a further object of the invention to provide a method of seismic prospecting wherein a vibratory source is operated so as to produce a comb spectrum.

It is another object of the invention to provide a method of seismic prospecting wherein the signals produced by the seismic receivers are digitized and transformed by means of the DFT, and wherein the signals introduced by the seismic source have substantial energy only at frequencies of the DFT.

These and other objects, features and advantages of the invention may be better understood by consideration of the following detailed discussion in conjunction with the accompanying drawings.

BRIEF DESCRIPTION OF THE DRAWINGS

FIGS. 4a and 4b illustrate the sweep signal generated for use by vibratory sources in one embodiment of the invention, and the frequency domain counterpart of the continuous vibrating signal.

FIG. 5 illustrates a roll-a-long prospecting method.

While not so limited, a first embodiment of the invention will be illustrated in a marine prospecting environment. With reference to FIG. 1, a prospecting vessel 10 transports both the seismic source and receivers at or near the surface of the water 12. The seismic source 14 typically comprises an air gun or an array of air guns. The seismic receivers comprise a plurality of hydrophones 16 carried by a seismic streamer 18. The length of such streamers is typically of the order of two kilometers. Energy from source 14 propagates downward through the water in the form of pressure variations, and enters the solid material of the earth at the seabed 20. The energy continues downward into the earth in the form of elastic waves. If the waves encounter an impedance discontinuity 22 such as the boundary between two layers of subsurface materials having different lithologic properties a portion of the wave is reflected back upward to be detected by the seismic receivers. A representative ray path 24 for such energy propagation is illustrated in FIG. 1.

Reflections from deep reflectors are received by the seismic receivers later in a record than energy from more shallow reflectors.

In prior art seismic prospecting methods, the source was fired once and data was then recorded from the seismic receivers for a sufficient period of time to ensure that reflection from the deepest reflector of interest were included within the record. Recording was then discontinued until the next time that the source was to be fired. In the practice of the present invention, data from the seismic receivers is recorded continuously. The source is fired periodically with a repetition rate substantially exceeding that used with prior art methods. In the past the minimum interval between successive firings of the source was about ten seconds. In the practice of the present invention on the other hand, a one second interval between successive firings is typical.

Figure 2A:
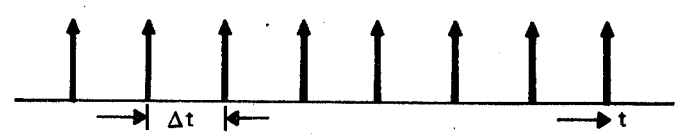
FIGS. 2a and 2b illustrate the infinite impulse train produced by an impulsive source in one embodiment of the invention and the frequency domain counterpart of the impulse train.

FIG. 2a is an idealized time diagram of the waveform produced by source 14. The contribution to the overall waveform produced by each firing of the source is represented by an impulse or Dirac-delta function. The source firings occur repetitively with a time interval $\Delta t$ between successive source firings. Thus the time function produced by source 14 can be represented by an infinite series of impulse functions.

Figure 2B:
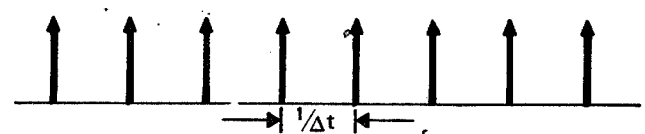

The Fourier transform of the time waveform of FIG. 2a is illustrated in FIG. 2b. As is well known, this frequency domain representation of the function also comprises an infinite series of impulse functions. Thus the power density spectrum of the waveform of FIG. 2a has energy only at a plurality of discrete frequencies. The spacing between adjacent frequencies where spectral peaks occur corresponds to a frequency difference of $\Delta f$ where:

$$\Delta f = 1/\Delta t.$$

This type of power density spectrum is referred to as a comb spectrum.

While the infinite series of impulse functions illustrated in FIGS. 2a and 2b are useful for certain conceptual purposes, in one sense they depart from the actual physical situation. This results principally from the fact that the mathematical Dirac-delta function assumed for the source waveform is not exactly achievable with physical structures. The Dirac-delta function is one whose time duration becomes infinitesmally small and whose amplitude becomes infinitely large. In actual practice, the waveforms produced by seismic air guns or other impulsive seismic sources have some short but finite duration and a large but not infinite amplitude. Therefore a more accurate portrayal of the actual time domain function produced by repeated firings of an air gun would be produced by convolving the inifinite series of impulse functions of FIG. 2a with the actual waveform produced by a single firing of the air gun. As is well known, convolution of two such functions in the time domain corresponds to multiplication of the transforms of the two time domain functions in the frequency domain. If one performs the Fourier transform on the typical wavelet produced by a single firing of an air gun, one obtains a transform which has significant values over some range of low frequencies and substantially zero amplitude at frequencies above some cutoff frequency. In other words the Fourier transform of such a time domain function to a certain extent resembles that of a low pass filter. If this type of transform is multiplied with the infinite series of impulse functions of FIG. 2b, there results a finite series of weighted impulse functions centered around frequency zero and extending from some cutoff frequency down to the negative counterpart of that cutoff frequency.

As noted above, in the practice of the present invention the signals received by the hydrophones are digitized and recorded continuously. There are no breaks in recording between shots as is the case in prior art methods. Thus for practical purposes the records from each hydrophone are infinite in extent. However, also for practical reasons, it is necessary to block the data into finite segments for processing. Such data may be sampled at a one millisecond sampling rate and a typical block length might be eight seconds.

The segment of sampled data is first converted to the frequency domain using the DFT. The functional representation of the digitized segment in the time domain is $h(n)$; $(n=0,1,2, \ldots ,N-1)$. For a segment length of approximately eight seconds with one millisecond sampling, N is actually chosen to have a value of 8192. This particular choice for the number of samples in a segment is dictated by the fact that the transformation is actually performed using the fast Fourier transform which requires that the number of samples in a segment be equal to some power of two.

The DFT is defined in equation 1.

$$H(k) = \sum_{n=0}^{N-1} h(n)\exp\{-i2\pi nk/N\}; k = (0,\pm1,\pm2,\ldots,\pm N/2\} \quad (1)$$

The DFT produces a plurality of transformed values in the frequency domain, each corresponding to a specific value of k. The frequency interval $\Delta f$ between any two adjacent transform values, that is between transform values at two consecutive values of the index k, is given by equation 2.

$$\Delta f = 1/N\tau; \quad (2)$$

where $\tau$ is the time domain sampling period.

For a sampling period of one millisecond and a segment having 8192 samples, the frequency interval $\Delta f$ has a value of 0.122 hertz. Therefore, the frequency domain function H(k) resulting from the DFT has a value at each of a plurality of frequencies where these frequencies are separated by intervals of 0.122 hertz. In the claims, these frequencies at which H(k) has values will be referred to as the frequencies of the DFT.

Figure 1:
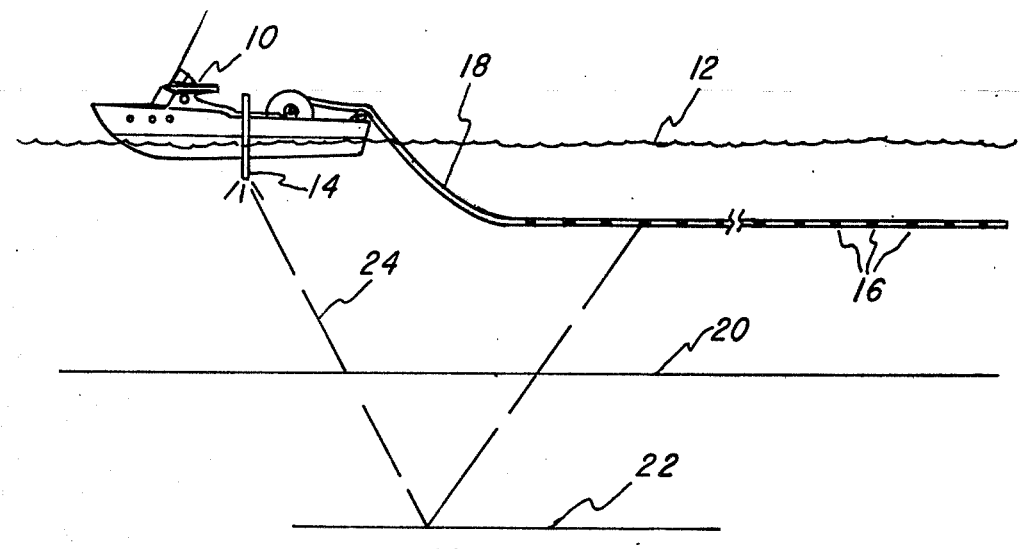
FIG. 1 illustrates a marine prospecting situation in which the method of the invention may be practised.

While frequency domain values are available at each 0.122 hertz, it may frequently be desirable to process only a subset of such values. A typical such subset may comprise the group consisting of every eighth available value. Then the frequency spacing between the values that are actually used has a value of 0.977 hertz. To ensure that all of the energy introduced by source 14 of FIG. 1 occurs at these frequencies that are actually used, it is necessary that the interval between adjacent spectral peaks of the source power density spectrum as illustrated in FIG. 2b also have a value of 0.977 hertz. This will be the case if the interval $\Delta t$ between successive firings of the source as illustrated in FIG. 2a has a value of 1.024 seconds.

In the preceeding theoretical discussion, the source waveform of FIG. 2a is assumed to be infinite in duration. As a practical matter, of course, the data must be processed in blocks, and in this description the blocks have been assumed to be 8192 samples in length. By exploiting the circularity property of the fast Fourier transform, however, the finite data block or segment of 8192 samples, with a source firing every 1024 samples ($\Delta t = 1024$ msec) appears as an effective infinite data segment with a periodic firing interval. The circularity property means that the finite data segment is assumed to be repeated in the Fourier analysis, and since the firing interval $\Delta t$ is an integer submultiple of the data block, periodically is returned in the Fourier transform.

Also it may not be possible to control the actual firing instants to the degree that might be desirable. As a result, the actual power density spectrum may be slightly different than that illustrated in FIG. 2b and small amounts of energy may occur at frequencies other than those denoted by the impulse functions. However, even in the practical case it may be said that the power density spectrum has substantially non-zero values only at certain discrete frequencies. Thus by means of the invention all of the source output energy is caused to occur at the frequencies which will be used in subsequent processing.

While this embodiment of the invention has been illustrated in a marine seismic prospecting environment, the same principles are applicable to the use of an impulse source in a land prospecting environment. This could be accomplished with the use of a dynamite source, for example.

Figure 3:
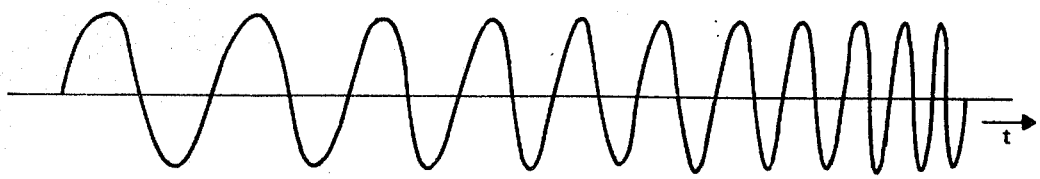
FIG. 3 shows a typical sweep signal generated by a vibratory source.

In another embodiment of the invention, a vibratory energy source is used. One such source is illustrated in U.S. Pat. No. 3,929,206. Such vibratory sources are typically hydraulically energized and serve to impart sinusoidal energy to the earth. The instantaneous frequency of the imparted signal can be controlled by the vibrator electronics and can be caused to vary in a preselected manner. A typical "sweep" or "chirp" waveform is illustrated diagrammatically in FIG. 3. In a typical case such a waveform may begin with an instantaneous frequency of five hertz and sweep linearly up to an instantaneous frequency of 100 hertz over a period of fifteen seconds. In the practice of the present invention, however, the instantaneous frequency of the vibrator is varied in a novel and highly advantageous manner so as to result in a comb power density spectrum.

More specifically, the instantaneous frequency is varied continuously in a periodic manner. FIGS. 4a and 4b illustrate such a sweep signal and its frequency domain counterpart when the nature of the periodic variation is sinusoidal. In FIG. 4a, the time interval $\Delta t$ covers one cycle of the periodic variation.

Thus the instantaneous frequency is caused to vary over a preselected range of frequencies in a period manner. Typically, the variation in the instantaneous frequency is at a lower frequency than any value of the instantaneous frequency itself. Looked at from the standpoint of communication theory, the vibrator can be thought of as having a carrier frequency which is frequency modulated by a low frequency modulating sine wave. As is well known, such a frequency modulated signal has the functional representation given in equation 3 below where $W_o$ and $W_m$ are the radian carrier and modulating frequencies respectively, and where $k_f$ is the degree of modulation.

$$h(t) = A\cos[W_o\int(1 + k_f\cos W_m t)dt + \theta_o] \quad (3)$$

$$= A\cos\left[W_o t + \frac{W_o k_f}{W_m}\sin W_m t + \theta_o\right]$$

Then neglecting the constant of integration $\theta_o$ as a constant angle and letting $$W_o k_f/W_m = M_f$$

where $M_f$ is called the deviation ratio, the following result is had:

$$h(t) = A\cos(W_o t + M_f\sin W_m t) \quad (4)$$

$$= A\{J_o(M_f)\cos W_o t -$$

$$J_1(M_f)[\cos(W_o - W_m)t - \cos(W_o + W_m)t] +$$

$$J_2(M_f)[\cos(W_o - 2W_m)t + \cos(W_o + 2W_m)t] -$$

$$J_3(M_f)[\cos(W_o - 3W_m)t - \cos(W_o + 3W_m)t] + \ldots\}$$

The $J_n$'s are Bessel functions of the first kind and order n.

The frequency modulated wave is seen to consist of an infinite series of s nusoids centered about the carrier frequency $W_o$. The other sinusoids are separated from the carrier frequency by frequency intervals which are integer multiples of the modulating frequency $W_m$. Individual sinusoids have amplitudes which are given by the various Bessel functions. In theory, the frequency modulated signal will cover the entire frequency spectrum with sidebands. In fact, the Bessel coefficients decrease rather rapidly and the series converges, so that actually the bandwidth that is excited by the vibrator is finite. The result is sinusoidally varying the instantaneous frequency of the vibrator output is a weighted comb power density spectrum, that is one having spectral peaks at uniformly separated discrete frequencies but wherein the amplitudes of the individual peaks are not uniform. It should also be noted that in equations 3 and 4, the amplitude A was assumed to be constant. In fact the amplitude of the vibrator output is typically frequency dependent with the amplitudes tending to reduce as the frequency increases. Therefore, to be precise, this amplitude dependence on frequency would have to be combined with the Bessel function weights to arrive at the true amplitudes of the various spectral peaks. The result, however, is still a weighted comb spectrum.

Again, to achieve the goal of the invention, the carrier frequency and the modulating frequency must be chosen so that the spectral peaks of the comb power density spectrum occur at frequencies of the DFT which are to be used. When operating with a vibratory source it is common to consider record lengths of approximately thirty seconds. If in fact a record of 32.768 seconds is utilized with a sampling rate of 4 milliseconds, then one again obtains a record having 8,192 samples. The spacing between adjacent frequencies in the DFT is 0.0305175 hertz. If one selects every thirty-second such frequency for subsequent processing, the interval between processed frequencies is 0.97656 hertz. One such processed frequency which occurs at about the middle of the band of interest is at 49.804662 hertz. Therefore, if the vibrator carrier frequency is selected to be at this frequency then the $W_o$ term of the expansion of equation 4 will occur at a processed frequency. Since the other processed frequencies will occur at integral multiples of 0.97656 hertz from this central frequency, the modulating frequency is selected to be 0.97656 hertz so that the sidebands of the vibrator signal occur at processed frequencies.

From the foregoing it is seen that the energy developed by the vibrator has a comb type spectrum. This method can be implemented in roll-a-long exploration. FIG. 5 is a diagramatic illustration of two-dimensional roll-a-long exploration. The top row of FIG. 5 illustrates the typical positions of a seismic source such as a vibrator, indicated by an asterisk, and eight geophone groups, indicated by open circles and arbitrarily numbered one through eight. In conventional exploration, after the vibrator has completed a sweep the geophone groups stop recording, the group at the back end of the line of groups is moved to the front end and the vibrator is moved up by the spacing between adjacent geophone groups to produce the spread illustrated in the second line of FIG. 5. Here the vibrator produces another sweep and the moveup procedure is repeated to produce the spread shown in the third line. This procedure of sweeping and then moving up is continued until coverage of the desired area has been completed. Note that in FIG. 5 the vertical separation on the page between the three spreads is for clarity of illustration only. Groups three through eight occupy the same positions in each of the three spreads shown.

In the practice of the present invention when the vibrator and groups are in the spread shown by the top line of FIG. 5, the vibrator is operated as above to produce a periodically frequency modulated waveform as discussed above. While this is taking place, a second vibrator is moved to the location illustrated in the second line of the FIGURE and a geophone group is moved to the head end of the spread. When the first vibrator is ready to be turned off, the second vibratory is turned on in synchronism with the first vibrator so the net effect is a continuation of the periodically frequency modulated waveform imparted to the earth. While the second vibrator is generating, the first vibrator is moved to the position shown in the third line of FIG. 5 where it is ready to pick up the sequence of signal generation from the second vibrator. In the preferred embodiment, the various geophone groups receive and record data continuously except during those intervals when the group is being moved. This continuous recording is characteristic of the preferred embodiment irrespective of the type of source.

The substantial data compaction provided by this method can be accomplished in the field thereby reducing the amount of data that must be recorded and transported to a processing center. As noted above, the continuously received data is blocked into finite segments for processing such as by the DFT. Advantageously, this can be done in the field as follows. As soon as a segment of data is received, it can be transformed using the DFT, the transform values at undesired frequencies discarded, and only the transform values at desired frequencies recorded on the storage medium such as magnetic tape. While this preliminary processing is taking place the geophone group is receiving and storing the next segment of data in temporary storage. As soon as this next segment has been completely received, it too is pre-processed while the group is recording the third segment. This procedure continues as desired so that the pre-processing including the data completion is accomplished virtually in real time with the result that the amount of data which must be recorded for subsequent processing is greatly reduced.

While in the embodiments illustrated, the comb spectrum has a plurality of regularly spaced spectral peaks, it is not necessary in the practice of the invention for such regular spacing to occur. In other words, some of the teeth of the comb can be missing. In the case of the vibrator embodiment, this variation is very nearly realized since certain of the spectral peaks will have amplitudes substantially below those of other spectral peaks. Thus certain of the spectral peaks in the comb are virtually non-existent. There may occur to those skilled in the art other variations which do not depart from the spirit of the invention as set forth in the following claims.

What is claimed is:

1. A method of seismic prospecting comprising the steps of:
    (a) imparting energy into the earth, the time variability of said energy being such that the power density spectrum of said energy has substantially non-zero values only at certain evenly spaced discrete frequencies,
    (b) using a seismic receiver to generate an electrical signal representative of said energy after propagation through the earth, and (c) converting a segment of said electrical signal to the frequency domain, said segment having a time duration T, wherein the frequency spacing between any adjacent pair of discrete frequencies at which said spectrum has substantially non-zero values is greater than 1/T.

2. A method of seismic prospecting comprising the steps of:
(a) imparting energy into the earth over a period of time, the time variability of said energy being such that the power density spectrum of said energy comprises a comb spectrum having substantially non-zero values at a plurality of evenly spaced discrete frequencies, the frequency spacing between any adjacent pair of said discrete frequencies being at least 0.5 hertz, and
(b) detecting said energy, after propagation through the earth, with at least one seismic receiver.

3. The method of claim 2 wherein an impulsive source is used to impart said energy into the earth.

4. The method of claim 2 wherein a sinusoidal source is used to impart said energy to the earth.

5. A method of seismic prospecting comprising the steps of:
(a) imparting energy into the earth, the time variability of said energy being such that the power density spectrum of said energy comprises a comb spectrum having substantially non-zero values only at certain discrete frequencies,
(b) using at least one seismic receiver to generate an electrical signal representative of said energy after propagation through the earth,
(c) digitizing said electrical signal, and
(d) obtaining the DFT of a segment of the electrical signal, said comb spectrum being selected such that the discrete frequencies where substantially non-zero energy occurs are frequencies of said DFT.

6. The method of claim 5 wherein said comb spectrum has substantially zero energy at at least one frequency of said DFT.

* * * * *